J. W. RAMAGE.
GASKET RETAINER.
APPLICATION FILED JULY 11, 1911.
1,027,565.
Patented May 28, 1912.
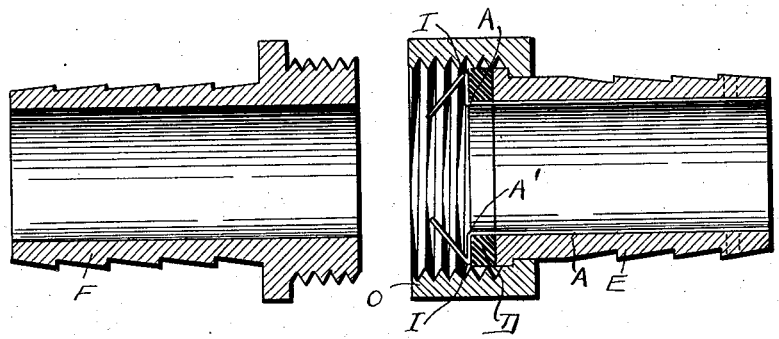
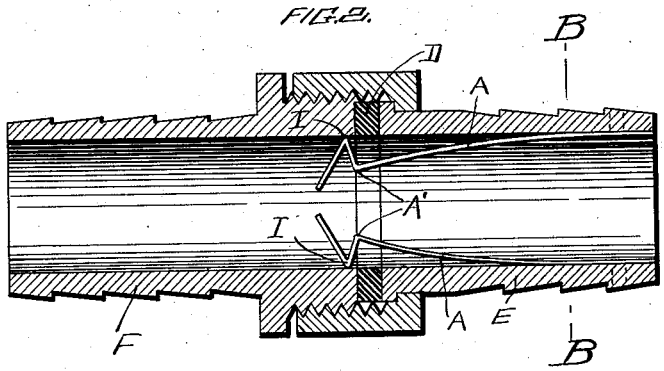
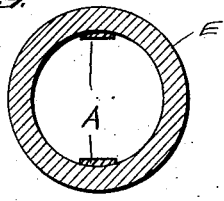
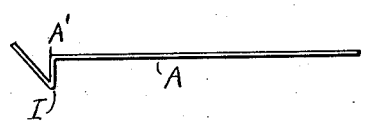
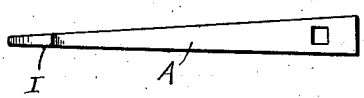
WITNESSES:
INVENTOR
J. W. Ramage,
BY Franklin N. Hough
Attorney

UNITED STATES PATENT OFFICE.

JONOTHAN WADE RAMAGE, OF EL PASO, TEXAS.

GASKET-RETAINER.

1,027,565.  Specification of Letters Patent. Patented May 28, 1912.

Application filed July 11, 1911. Serial No. 637,941.

*To all whom it may concern:*

Be it known that I, JONOTHAN WADE RAMAGE, a citizen of the United States, residing at El Paso, in the county of El Paso and State of Texas, have invented a new and useful Gasket-Retainer, of which the following is a specification.

This invention relates to new and useful improvements in devices for use in connection with hose couplings to hold washers in place, and consists of a simple and efficient device which is illustrated in the accompanying drawings in which—

Figure 1 is a vertical central longitudinal sectional view through the two coupling ends of hose pipes, the same being shown as disconnected. Fig. 2 is a similar view showing the couplers connected. Fig. 3 is a face view of a washer holding member. Fig. 4 is an edge view of the washer holding device, and Fig. 5 is a cross sectional view taken on the line *b—b* of Fig. 1.

Reference now being had to the details of the drawing by letter, E and F designate the coupler heads, the former of which has a flange at one end over which the flanged shell O fits against the flange of the member E, and has interior threaded portions designed to engage threads formed on the circumference of the coupling member F in the usual manner in hose couplings.

A washer designated by letter D is interposed between the ends of the couplers and in order to hold the washer in place, when the coupler heads are disconnected, resilient members A are provided which are fastened at corresponding ends to one of the coupler members as E. Each of said resilient members A, is bent at right angles at A′, to engage the washer in the manner shown in Fig. 1 of the drawings, and is again bent at an acute angle at a point indicated by the numeral I, the two free ends of the resilient members extending toward each other at inclinations.

In operation when the coupler heads are disconnected, the springs will normally hold the washer in the manner shown in Fig. 1, of the drawings, and when the two coupler heads are brought together in the manner shown in Fig. 2, the end of the member F coming in contact with the inclined portions of the resilient members A, will cause the same to spring toward each other and out of contact with the washer, and bearing with their angled portions I against the inner surface of the coupler head F, and not interfering with the coupling of the members together. When the coupler heads are unscrewed, the resilient members A will be thrown back to their normal holding positions against the washer, as shown in Fig. 1 of the drawings.

It will thus be seen, from the foregoing that by the provision of my improved device, the washer holding members are automatically thrown out of the path of the coupler heads when they are connected together, and when they are disconnected, will spring back and hold the washer against the end of the member E.

What I claim as new is:—

A device for holding a washer upon a coupling member, comprising two coupler heads, resilient members fastened to the inner surface of one of said coupler heads, and having right angled portions designed to engage and hold a washer against the end of said coupler head when the coupler heads are disconnected, the free end of each of said resilient members being bent at an acute angle, and extending toward each other, and against which the other coupler head is adapted to bear to move the same from between the coupler heads as they are brought together, as set forth.

JONOTHAN WADE RAMAGE.

Witnesses:
 BENJAMIN FRANKLIN YOUNG,
 MILTON ROSS KIESTER.

---

Copies of this patent may be obtained for five cents each, by addressing the "Commissioner of Patents, Washington, D. C."